US012373450B2

(12) United States Patent
Tschetter et al.

(10) Patent No.: US 12,373,450 B2
(45) Date of Patent: Jul. 29, 2025

(54) QUERY-TIME DATA SESSIONIZATION AND ANALYSIS

(71) Applicant: Imply Data, Inc., Burlingame, CA (US)

(72) Inventors: Eric Tschetter, Tokyo (JP); Rohan Garg, New Delhi (IN)

(73) Assignee: Imply Data, Inc., Burlingame, CA (US)

( * ) Notice: Subject to any disclaimer, the term of this patent is extended or adjusted under 35 U.S.C. 154(b) by 0 days.

(21) Appl. No.: 18/353,831

(22) Filed: Jul. 17, 2023

(65) Prior Publication Data
US 2024/0020311 A1    Jan. 18, 2024

Related U.S. Application Data

(60) Provisional application No. 63/389,443, filed on Jul. 15, 2022.

(51) Int. Cl.
*G06F 16/00* (2019.01)
*G06F 16/22* (2019.01)
(Continued)

(52) U.S. Cl.
CPC ...... *G06F 16/2462* (2019.01); *G06F 16/2264* (2019.01); *G06F 16/2282* (2019.01);
(Continued)

(58) Field of Classification Search
CPC ........... G06F 16/2433; G06F 16/24542; G06F 16/2462; G06F 16/283; G06F 16/287;
(Continued)

(56) References Cited

U.S. PATENT DOCUMENTS 10,108,648 B2 * 10/2018 Rajan .................. G06F 16/2272
10,324,917 B2 *  6/2019 Tutuk .................. G06F 16/2282
(Continued)

FOREIGN PATENT DOCUMENTS

EP           2843567 B1 *  5/2017
WO      WO2006009822 A2 *  1/2006
(Continued)

OTHER PUBLICATIONS

Stefan Esser et al., "Multi-Dimensional Event Data in Graph Databases", Journal on Data Semantics (2021) 10:109-141 Published online: May 27, 2021.*
(Continued)

*Primary Examiner* — Srirama Channavajjala
(74) *Attorney, Agent, or Firm* — Patent Law Works, LLP

(57) ABSTRACT

A system and method for implementing an iterative query mechanism to facilitate query-time sessionization and analysis of data is disclosed. At least, the method includes determining a table of independent events, determining a query, the query including a parameter specifying a size limit on a sample of sessions, executing the query against the table of independent events, at the time of query execution, processing the table of independent events to reconstruct the sample of sessions approaching the size limit, and at the time of query execution, analyzing the sample of reconstructed sessions to generate a result.

14 Claims, 3 Drawing Sheets

(51) Int. Cl.
*G06F 16/242* (2019.01)
*G06F 16/245* (2019.01)
*G06F 16/2453* (2019.01)
*G06F 16/2457* (2019.01)
*G06F 16/2458* (2019.01)
*G06F 16/26* (2019.01)
*G06F 16/28* (2019.01)

(52) U.S. Cl.
CPC ........ *G06F 16/2433* (2019.01); *G06F 16/245* (2019.01); *G06F 16/24539* (2019.01); *G06F 16/24542* (2019.01); *G06F 16/24578* (2019.01); *G06F 16/26* (2019.01); *G06F 16/283* (2019.01); *G06F 16/287* (2019.01)

(58) Field of Classification Search
CPC .. G06F 16/26; G06F 16/2282; G06F 16/2264; G06F 16/245; G06F 11/3006; G06F 11/302; G06F 11/3082; G06F 11/3409; G06F 11/3495; G06F 16/24539; G06F 16/24578; G06F 16/9024; G06F 16/9536; G06F 16/24573; G06F 16/95; G06N 20/00; H04L 43/045; G06Q 30/02
See application file for complete search history.

(56) References Cited

U.S. PATENT DOCUMENTS

| | | | | |
|---|---|---|---|---|
| 11,204,898 | B1* | 12/2021 | Waas | G06F 16/156 |
| 11,620,541 | B1* | 4/2023 | Ghosh | G06N 5/04 |
| | | | | 707/600 |
| 2004/0225639 | A1* | 11/2004 | Jakobsson | G06F 16/24542 |
| 2006/0173878 | A1* | 8/2006 | Bley | G06F 16/258 |
| 2007/0174256 | A1* | 7/2007 | Morris | G06F 16/2462 |
| 2007/0271145 | A1 | 11/2007 | Vest | |
| 2011/0055198 | A1* | 3/2011 | Mitchell | G06F 16/2455 |
| | | | | 707/E17.136 |
| 2011/0319080 | A1 | 12/2011 | Bienas et al. | |
| 2012/0084287 | A1* | 4/2012 | Lakshminarayan | |
| | | | | G06F 16/2462 |
| | | | | 707/E17.089 |
| 2014/0156683 | A1* | 6/2014 | de Castro Alves | |
| | | | | G06F 16/24568 |
| | | | | 707/774 |
| 2015/0066966 | A1* | 3/2015 | O'Donnell | H04L 67/10 |
| | | | | 707/756 |
| 2015/0088823 | A1* | 3/2015 | Chen | G06F 16/273 |
| | | | | 707/626 |
| 2015/0248464 | A1* | 9/2015 | Desai | G06F 16/24568 |
| | | | | 707/724 |
| 2017/0286496 | A1* | 10/2017 | Pang | G06F 16/2477 |
| 2017/0286532 | A1* | 10/2017 | Horowitz | G06F 16/2428 |
| 2017/0364558 | A1* | 12/2017 | Thorne | G06F 16/2365 |
| 2018/0018388 | A1* | 1/2018 | Mulla | G06F 16/24562 |
| 2018/0121856 | A1* | 5/2018 | Song | G06Q 10/06393 |
| 2019/0138639 | A1 | 5/2019 | Pal et al. | |
| 2020/0201927 | A1* | 6/2020 | Narula | G06F 16/904 |
| 2021/0042302 | A1* | 2/2021 | Miao | G06F 16/2453 |
| 2021/0287250 | A1 | 9/2021 | Wang et al. | |
| 2021/0397616 | A1* | 12/2021 | Iranmanesh | G06F 16/9537 |
| 2023/0118230 | A1* | 4/2023 | Tschetter | G06F 16/2471 |
| | | | | 707/770 |
| 2023/0229659 | A1* | 7/2023 | Beresniewicz | G06F 16/217 |
| | | | | 707/718 |

FOREIGN PATENT DOCUMENTS

| | | | |
|---|---|---|---|
| WO | WO2007022560 A1 * | 3/2007 | |
| WO | WO 2008043082 A2 * | 4/2008 | |
| WO | WO2014169265 A1 * | 10/2014 | |

OTHER PUBLICATIONS

Yuanzhe Hao et al., "TS-Benchmark: A Benchmark for Time Series Databases", 2021 IEEE 37th International Conference on Data Engineering (ICDE), Jun. 2021.*

T. Johnson et al., "Query-Aware Sampling for Data Streams", 2007 IEEE 23rd International Conference on Data Engineering Workshop (2007, pp. 664-673).*

Ushijima, K et al., "SUPRA: a sampling-query optimization method for large-scale OLAP", Proceedings Ninth International Workshop on Database and Expert Systems Applications (Cat. No. 98EX130) (1998, pp. 232-237).*

Massimo Melucci, "Impact of Query Sample Selection Bias on Information Retrieval System Ranking", 2016 IEEE International Conference on Data Science and Advanced Analytics (DSAA) (Dec. 2016, pp. 341-350).*

PCT International Search Report and Written Opinion, Imply Data, Inc. PCT/US23/27949, filing date Jul. 17, 2023, mail date Oct. 24, 2023, 11 pgs.

* cited by examiner

QUERY-TIME DATA SESSIONIZATION AND ANALYSIS

CROSS-REFERENCE TO RELATED APPLICATIONS

The present application claims priority, under 35 U.S.C. § 119, of U.S. Provisional Patent Application No. 63/389,443, filed Jul. 15, 2022, and entitled "Sessionization & Web Analytics Application," which is incorporated by reference in its entirety.

BACKGROUND

The specification generally relates to implementing a query mechanism for dynamically building and analyzing data sessions. In particular, the specification relates to a system and method for implementing a query mechanism to facilitate query-time sessionization and analysis of large datasets.

Business users explore and investigate large datasets for insight that may impact day-to-day and long-range decision making. Oftentimes, data queries made by such business users, such as online analytical processing (OLAP) based queries, process millions upon millions of rows of data for a result. However, the processing and analyzing of the large datasets for the types of queries that the business users are interested in carry with them significant burden in terms of understanding the data models and complexity of analysis. For example, one of the challenges that the business users face is with the scale of the data analysis that they want but it tends to dominate the processing time and causes a slowdown in real-time data analytics. As such, there is a persistent need for a mechanism that facilitates dynamically building and analyzing sessions from large datasets at query-time.

This background description provided herein is for the purpose of generally presenting the context of the disclosure.

SUMMARY

The techniques introduced herein overcome the deficiencies and limitations of the prior art, at least in part, with a system and method for implementing a query mechanism to facilitate query-time sessionization and analysis of large datasets.

According to one innovative aspect of the subject matter described in this disclosure, a method includes: determining a table of independent events, determining a query, the query including a parameter specifying a size limit on a sample of sessions, executing the query against the table of independent events, at the time of query execution, processing the table of independent events to reconstruct the sample of sessions approaching the size limit, and at the time of query execution, analyzing the sample of reconstructed sessions to generate a result.

According to another innovative aspect of the subject matter described in this disclosure, a system includes: one or more processors; a memory storing instructions, which when executed cause the one or more processors to: determine a table of independent events, determine a query, the query including a parameter specifying a size limit on a sample of sessions, execute the query against the table of independent events, at the time of query execution, process the table of independent events to reconstruct the sample of sessions approaching the size limit, and at the time of query execution, analyze the sample of reconstructed sessions to generate a result.

These and other implementations may each optionally include one or more of the following features. For instance, the features may include processing the table of independent events to aggregate a plurality of independent events into a time-ordered series of events and reconstruct the sample of sessions based on the time-ordered series of events at the time of query execution, transforming the reconstructed sample of sessions into a data structure, and rendering a visualization based on the data structure. For instance, the features may further include determining the query comprising receiving a user interaction in association with the visualization and determining the query based on the user interaction. For instance, the features may further include processing the table of independent events to reconstruct the sample of sessions comprising processing the table of independent events to dynamically reconstruct the sample of sessions using a random sampling method. For instance, the features may further include performing funnel analysis using the result. For instance, each reconstructed session in the sample of reconstructed sessions including a sequence of events mapped to a unique identifier, the unique identifier including at least one from a session identifier, client device identifier, and a user identifier, and the table of independent events being loaded with data retrieved from one of a streaming data source and a batch data source.

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

The features and advantages described herein are not all-inclusive and many additional features and advantages will be apparent in view of the figures and description. Moreover, it should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
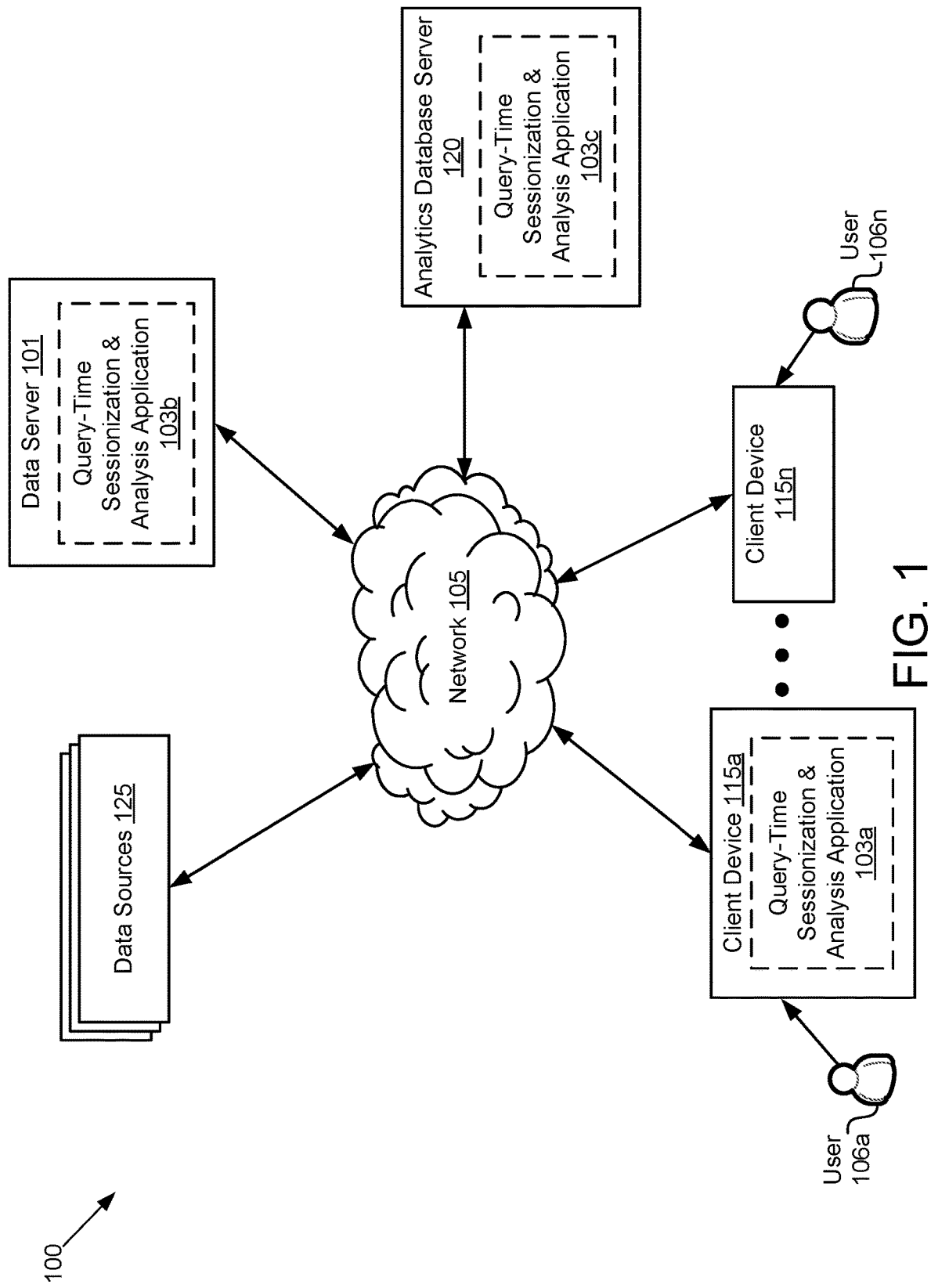
FIG. 1 is a high-level block diagram illustrating one implementation of an example system for implementing a query mechanism to facilitate query-time sessionization and analysis of data.

In the world of big data, data tends to be collected as individual events. For example, an event may include a view of a web page, an addition of an item to a shopping cart, a click on an advertisement banner, an input of a query that computes 'n' bytes of data, an initiation of an application programming call (API) call, etc. When a user, such as a data systems administrator is monitoring the performance of the system, they typically want to understand the aggregation of all these events at a point in time to determine how the system as a whole is operating. For example, the aggregate latency of API calls provides the user with an indication of how the API is performing at that point in time. However, a user operating within a business context may not be that much interested in understanding the performance of the system than they are about wanting to understand about the user or session. For example, the user may not find useful that the API latency at 5 AM on 2021-01-01 was 30 milliseconds. Rather, the user may want to extract meaningful information in the business context out of the data, such as whether a given customer experienced a timeout when accessing a web resource. If the customer experienced a timeout, did they try again to access the web resource or quit right after (i.e., did the timeout cause a churn?). The user may also find it useful to know what percentage of customers returned after experiencing a timeout compared to those who never returned. These type of queries carry with them significant burden in terms of understanding data models and complexity of analysis of large datasets.

One example problem may be found in web analytics, such as clickstream funnel analysis. Funnel analysis may involve mapping and analyzing a series of events that lead towards a defined goal. For example, a data analysis of the funnel is an effective way to determine conversion rates on specific user behaviors. However, the data analysis of funnels using existing techniques may not ensure time ordering. For instance, consider a question "Who did action X, then action Y, and then action Z?" originating from a user. One existing approach to answering this question is to first independently build the sets of customers who did action X, action Y, and action Z and then analyze how many customers that did action X also did action Y and then how many among them also did action Z. This approach is effectively a "set intersection" and does not distinguish an action ordering of the type X→Y→Z from another action ordering of the type X→Z→Y. For example, a customer who did actions in the order of Z→Z→Z→Y→Y→X would be considered as completing all steps of the "X→Y→Z" funnel because the customer would exist in all three sets.

This problem may also be seen with identifying and tracking product purchases from an e-commerce website or brick-and-mortar store. For instance, even though a customer purchases an item today, there is no guarantee that they will not return the same item the next day or within a return window. After returning the item, the customer may never come back again to the e-commerce website for business. Additionally, that item itself may be returned and never be sold again, or only be sold at a discount that requires a negative margin. Additionally, of the items that were returned, there may be items that were re-sold only to be returned yet again. These types of activities in the business context deserve further investigation by the business user of the e-commerce website. In another instance in e-commerce, packages that were ordered may fail to be delivered to customers. The business user may want to know how often does it happen, when it happens, and how does it impact the lifetime value of the customer. As such, these types of questions may require identifying multiple events that happen over a course of time in order to draw a specific conclusion. The solution is to combine the events together with an identifier (e.g., user identifier, session identifier, or anything that the events may have in common) and perform analysis on those combined events. The process of combining of events is known as sessionization and such a combination of events is known as a session. Sessionization refers to the process of identifying events in the event-based data and creating sessions. A session may include a series of events occurring in sequence with a start and an end. During sessionization, events within a period of time or with regard to a completion of a task may be identified in the event-based data and then assigned to a session with a specific session key. Sessionization is performed on the data to track and analyze the events. Sessionization has varied use cases and each use case may have different requirements. For example, sessionization may be performed on clickstream data to identify and create sessions from events indicative of a user's behavior on a website or an application and to perform analytics (e.g., funnel analysis) on the sessions to track user actions.

In the following disclosure, a query-time sessionization and analysis (S&A) application 103 is used to dynamically perform sessionization and real-time analysis of data at query-time. The query-time S&A application 103 turns event-based data from a table of independent events into sessions and analyzes the sessionized data at the time of query execution. The query-time S&A application 103 determines an input table of independent events populated with raw event-based data. The query-time S&A application 103 performs an unbiased random sampling of sessions in the input table of events and analyzes only those sample of sessions as the query is executing. The query-time S&A application 103 advantageously limits the number of sessions that are analyzed based on the query to maintain sizing so that the need for additional computing resources required to shuffle and re-shuffle millions upon millions of different session keys is eliminated. For example, the query-time S&A application 103 may limit the number of sessions for analysis based on a timeframe (e.g., hours, days, etc.), a set of users (member users, guest users, etc.), a geographical location (e.g., zip code, country, etc.), or any other criteria specified in the query that defines the sampling. This is in contrast to an existing approach where all of the data from the table of events is pre-processed, combined into sessions, and persisted in storage before the analytics are performed on the stored sessions. The existing approach is computationally expensive because a significant portion of sessions may get unnecessarily created even though they are not analyzed as part of the query and simply get discarded. The existing approach for this sort of analytics leverages window functions in structured query language (SQL) to define a flow of events but it suffers from issues of scale. For example, a window function in SQL requires all of the data to exist for a given identifier on the same node in order to do the processing, which carries with it limitations on scale and parallelization. Specifically, as the processing needs to compute the results for millions or billions of sessions, re-routing the data for the sub-processing (e.g., nested queries) tends to dominate the processing time. While efforts can be made to optimize said processing by eliminating performance bottlenecks, the incoming event-based data will continue to grow and the existing approach will simply lead to deeper and deeper shuffling of data. This makes for a relatively complex processing of queries in addition to exposing the potential points of failure in the system with wide variability in terms of system performance. The present disclosure is particularly advantageous because it puts forward a novel approach that enables similar analysis without the same complexities in parallelization and system scaling.

FIG. 1 is a high-level block diagram illustrating one implementation of an example system 100 for implementing a query mechanism to facilitate query-time sessionization and analysis of data. The illustrated system 100 may have one or more client devices 115a . . . 115n that can be accessed by users 106a . . . 106n, a data server 101, an analytics database server 120, and a plurality of data sources 125. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105 for interaction and electronic communication with one another. While one implementation of the functionality of the system 100 is described below with reference to the client-server architecture shown in FIG. 1, it should be understood that the functionality of the system 100 may be implemented in other architectures. For example, in some implementations, the system 100 may be configured on a single computer (or virtual machine) coupled to the network 105 to provide a loopback communication using Transmission Control Protocol_(TCP) or sockets.

The network 105 may be a conventional type, wired or wireless, and may have numerous different configurations including a star configuration, token ring configuration, or other configurations. Furthermore, the network 105 may include any number of networks and/or network types. For example, the network 105 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, near field networks (e.g., NFC, etc.), and/or other interconnected data paths across which multiple devices may communicate, various combinations thereof, etc. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 105 may include packetized data (e.g., Internet Protocol (IP) data packets) that is routed to designated computing devices coupled to the network 105. Although FIG. 1 illustrates one network 105 coupled to the client devices 115, the data server 101, the analytics database server 120, and the plurality of data sources 125, in practice one or more networks 105 can be connected to these entities.

The client devices 115a . . . 115n (also referred to individually and collectively as 115) may be computing devices having data processing and communication capabilities. In some implementations, a client device 115 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 115a . . . 115n may couple to and communicate with one another and the other entities of the system 100 via the network 105 using a wireless and/or wired connection.

Examples of client devices 115 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing a network 105.

In the example of FIG. 1, the client device 115a is configured to implement a query-time sessionization and analysis (S&A) application 103a described in more detail below. The client device 115 includes a display for viewing information provided by one or more entities coupled to the network 105. For example, the client device 115 may be adapted to send and receive data to and from one or more of the data server 101, the data sources 125, and the analytics database server 120. While FIG. 1 illustrates two client devices 115a and 115n, the disclosure applies to a system architecture including any number of client devices 115. In addition, the client devices 115a . . . 115n may be the same or different types of computing devices. The client devices 115a . . . 115n may be associated with the users 106a . . . 106n. For example, users 106a . . . 106n may be authorized personnel including data managers, data analysts, admins, end users, engineers, technicians, administrative staff, etc. of a business organization. In some implementations, the client device 115 may run a user application. The user application may include web, mobile, enterprise, and cloud application. For example, the client device 115 may include a web browser that may run JavaScript or other code to allow authorized personnel to access the functionality provided by other entities of the system 100 coupled to the network 105. In some implementations, the client device 115 may be implemented as a computing device 200 as will be described below with reference to FIG. 2.

In the example of FIG. 1, the system 100 may include a data server 101, a plurality of data sources 125, and an analytics database server 120 coupled to the network 105. The entities 101, 120, and 125 may be, or may be implemented by, a computing device including a processor, a memory, applications, a database, and network communication capabilities similar to that described below with reference to FIG. 2.

In some implementations, each one of the entities 101, 120, and 125 of the system 100 may be a hardware server, a software server, or a combination of software and hardware. For example, the data server 101 may include one or more hardware servers, virtual servers, server arrays, storage devices and/or systems, etc., and/or may be centralized or distributed/cloud-based. In some implementations, each one of the entities 101, 120, and 125 of the system 100 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, each one of the entities 101, 120, and 125 of the system 100 may be a Hypertext Transfer Protocol (HTTP) server, a Representational State Transfer (REST) service, or other server type, having structure and/or functionality for processing and satisfying content requests and/or receiving content from the other entities 101, 120, and 125 and one or more of the client devices 115 coupled to the network 105. Also, instead of or in addition, each one of the entities 101, 120, and 125 of the system 100 may implement its own application programming interface (API) for facilitating access and the transmission of instructions, data, results, and other information to other one of the entities 101, 120, and 125 communicatively coupled to the network 105.

In the example of FIG. 1, the components of the data server 101 may be configured to implement a query-time S&A application 103b described in more detail below. In some implementations, the data server 101 may provide a service for facilitating online analytical processing (OLAP), such as data analysis, data exploration, and visualization of large datasets. It should be understood that the data server 101 is not limited to providing the above-noted acts and/or functionality and may include other network-accessible services.

In some implementations, the data server 101 may be configured to send and receive data and analytics to and from other entities of the system 100 via the network 105. For example, the data server 101 sends and receives data including instructions to and from the client device 115. In some implementations, the data server 101 may serve as a middle layer and permit interactions between the client device 115 and each of the analytics database server 120 and the plurality of data sources 125 to flow through and from the data server 101. In some implementations, the data server 101 may use a set of query tools including a query planner and a custom query language to make expressions for querying and interacting with big data in the analytics database server 120. In some implementations, the data server 101 may also include database (not shown) coupled to it (e.g., over the network 105) to store structured data in a relational database and a file system (e.g., HDFS, NFS, etc.) for unstructured or semi-structured data. In some implementations, the data server 101 may include an instance of a data storage 243 (shown in FIG. 2) that stores various types of data for access and/or retrieval by the query-time S&A application 103b. Although only a single data server 101 is shown in FIG. 1, it should be understood that there may be any number of data servers 101 or a server cluster. It should be understood that the data server 101 may be representative of a data analytics service provider and there may be multiple data analytics service providers coupled to the network 105, each having its own server or a server cluster, applications, application programming interface, etc.

In the example of FIG. 1, the system 100 may include a plurality of data sources 125. The plurality of data sources 125 may communicate with one or more entities of the system 100, such as the analytics database server 120 and the data server 101. The plurality of data sources 125 may include a data stream generator, a data warehouse, a system of record (SOR), or belonging to a data repository owned by an organization that provides real-time or close to real-time data automatically or responsive to being polled or queried by the analytics database server 120 and/or the data server 101. For example, a data source 125 may be a business-owned server that generates and stores company's raw data (e.g., a data source) which may be ingested by the analytics database server 120. Such raw data may include large, fast-moving, and up-to-date data. Examples of data provided by the plurality of data sources 125 may include, but are not limited to, marketing and advertising campaign data, product and website clickstream data, application performance data, network data, service performance data, supply chain activity data, Internet of Things (IoT) data, social media feeds, financial market data, sensor data, etc. In some implementations, a data source 125 may be an application performance management system used by a business that includes one or more program analysis tools (e.g., sampling profilers) to aggregate profiling data of distributed applications deployed by a company.

In the example of FIG. 1, the components of the analytics database server 120 may be configured to implement a query-time S&A application 103c described in more detail below. In some implementations, the analytics database server 120 may be configured to implement an analytics database service (e.g., Apache Druid™) that is configured to receive, store, extract, load, and transform company raw data (e.g., Big data) associated with the plurality of data sources 125 for performing data exploration and visualization in conjunction with the data server 101 (e.g., Imply™ Pivot). For example, the analytics database server 120 may be configured as a database backend for powering graphical user interfaces of analytical applications enabled by the data server 101. In some implementations, the analytics database server 120 and the data server 101 may be integrated into a single computing device for facilitating OLAP and configured to be deployed on premises of a business. In other implementations, the analytics database server 120 and the data server 101 may be configured to be located and deployed remotely. The analytics database server 120 may be configured to support one or more structured query language (SQL) dialects. In some implementations, the analytics database server 120 may be configured to stream data from message buses, such as Apache Kafka, Amazon Kinesis, etc. In some implementations, the analytics database server 120 may be configured to ingest data in batch mode by retrieving files from Hadoop Distributed File System (HDFS), Amazon™ Simple Storage Service (S3), or local filesystem sources. For example, a data manager may configure ingestion of data into the analytics database server 120. Data ingestion may include creating or writing into a database or 'datasource' that is queryable. For example, a datasource may include a table datasource, a union datasource, and query datasource. A data source 125 (two words) refers to a source of data that is ingested into the analytics database server 120. In some implementations, the analytics database server 120 may be configured to partition a datasource by attributes, such as time. Each time range may be referred to as a chunk (e.g., a single day, if the datasource is partitioned by day). Within a chunk, data is partitioned further into one or more segments. In other words, the segments may be organized into time chunks. A segment may be a single file comprising millions of rows of data. The analytics database server 120 distributes the data segments of a datasource across a cluster of computing devices.

In some implementations, the analytics database server 120 may also include database (not shown) coupled to it (e.g., over the network 105) to store structured data in a relational database and a file system (e.g., HDFS, NFS, etc.) for unstructured or semi-structured data. In some implementations, the analytics database server 120 may include an instance of a data storage 243 (shown in FIG. 2) that stores various types of data for access and/or retrieval by the query-time S&A application 103c. Although only a single analytics database server 120 is shown in FIG. 1, it should be understood that there may be any number of independent analytics database servers 120 deployed in a server cluster or distributed over the network 105 as node machines for performing their functionality (e.g., servicing distributed queries).

The query-time S&A application 103 may include software and/or logic to provide the functionality for implementing a query mechanism to facilitate query-time sessionization and analysis of very large data sets. In some implementations, the query-time S&A 103 may be implemented using programmable or specialized hardware, such as a field-programmable gate array (FPGA) or an application-specific integrated circuit (ASIC). In some implementations, the query-time S&A application 103 may be implemented using a combination of hardware and software. In some implementations, the query-time S&A application 103 may be stored and executed on a combination of the client devices 115, the analytics database server 120, and the data server 101, or by any one of the client devices 115, the analytics database server 120, or data server 101.

As depicted in FIG. 1, the query-time S&A application 103a, 103b, and 103c is shown in dotted lines to indicate that the operations performed by the query-time S&A application 103a, 103b, and 103c as described herein may be performed at the client device 115, the data server 101, the analytics database server 120, or any combinations of these components. In some implementations, each instance 103a, 103b, and 103c may include one or more components of the query-time S&A application 103 depicted in FIG. 2, and may be configured to fully or partially perform the functionalities described herein depending on where the instance resides. In some implementations, the query-time S&A application 103 may be a thin-client application with some functionality executed on the client device 115 and additional functionality executed on the data server 101 and the analytics database server 120. In some implementations, the query-time S&A application 103 may generate and present various user interfaces to perform these acts and/or functionality, which may in some cases be based at least in part on information received from the data server 101, the client device 115, the analytics database server 120, and/or the data sources 125 via the network 105.

In some implementations, the query-time S&A application 103 is code operable in a web browser, a web application accessible via a web browser, a native application (e.g., mobile application, installed application, etc.) on the client device 115, a plug-in or an extension, a combination thereof, etc. Additional structure, acts, and/or functionality of the query-time S&A application 103 is further discussed below with reference to at least FIG. 2. While the query-time S&A application 103 is described below as a stand-alone component, in some implementations, the query-time S&A application 103 may be part of other applications in operation on the client device 115, the data server 101, and the analytics database server 120. While the examples herein describe one aspect of underlying query mechanism for data analytics, it should be understood that the query-time S&A application 103 may be configured to facilitate and guide the user from end-to-end, for example, from data ingestion to data visualization.

In some implementations, the query-time S&A application 103 may require users to be registered with the data server 101 and/or the analytics database server 120 to access the acts and/or functionality described herein. The query-time S&A application 103 may require a user to authenticate his/her identity to access various acts and/or functionality provided by the query-time S&A application 103. For example, the query-time S&A application 103 may require a user seeking access to authenticate their identity by inputting credentials in an associated user interface. In another example, the query-time S&A application 103 may interact with a federated identity server (not shown) to register and/or authenticate the user by receiving and verifying biometrics including username and password, facial attributes, fingerprint, and voice.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 101 to a client device 115, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
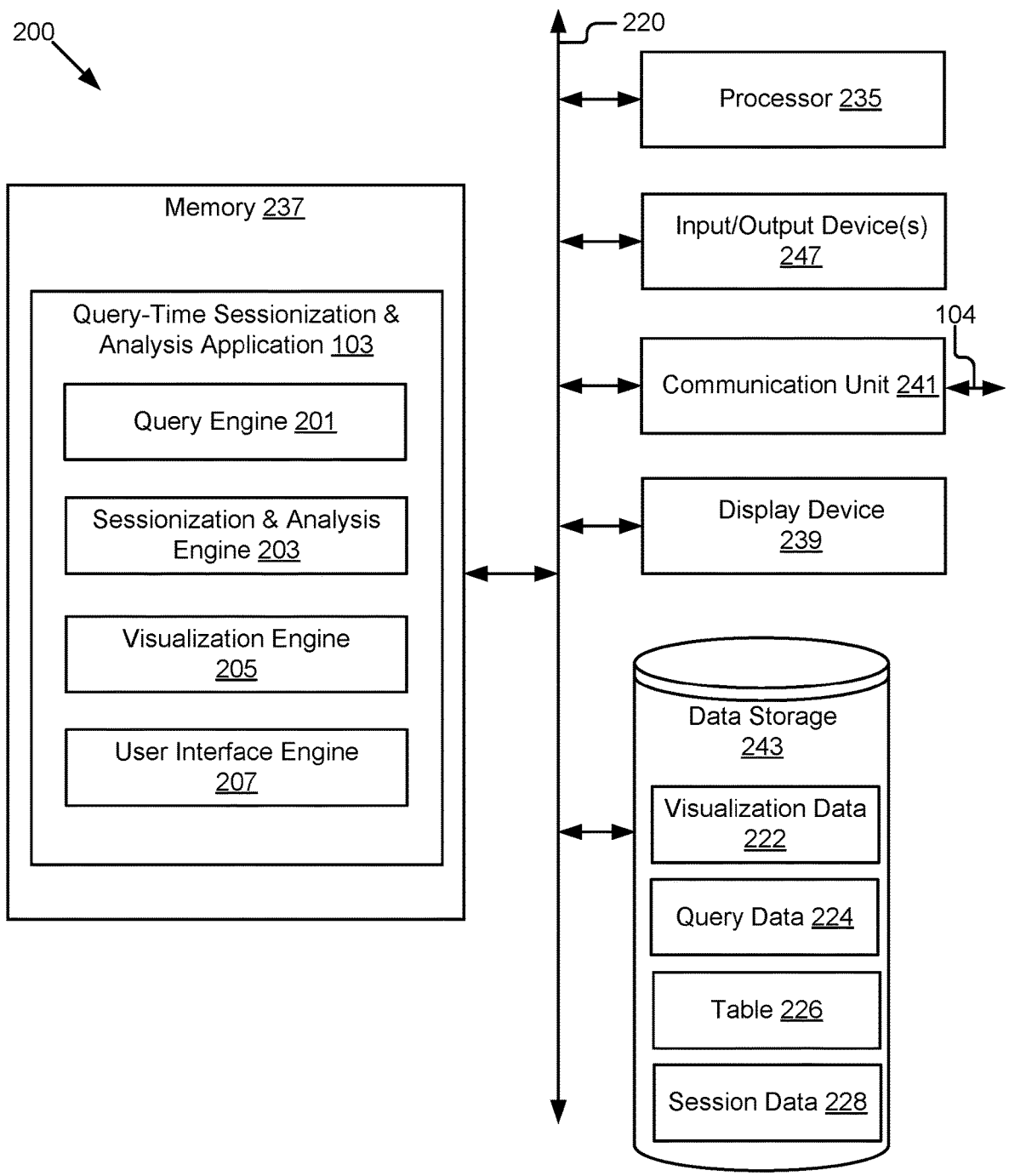
FIG. 2 is a block diagram illustrating one implementation of an example computing device including a query-time sessionization and analysis application.

FIG. 2 is a block diagram illustrating one implementation of a computing device 200 including a query-time S&A application 103. The computing device 200 may also include a processor 235, a memory 237, a display device 239, a communication unit 241, an input/output device(s) 247, and a data storage 243, according to some examples. The components of the computing device 200 are communicatively coupled by a bus 220. In some implementations, the computing device 200 may be the client device 115, the data server 101, the analytics database server 120 or a combination of the client device 115, the data server 101, and the analytics database server 120. In such implementations where the computing device 200 is the client device 115, the data server 101 or the analytics database server 120, it should be understood that it may take other forms and include additional or fewer components without departing from the scope of the present disclosure. For example, while not shown, the computing device 200 may include sensors, capture devices, additional processors, and other physical configurations. Additionally, it should be understood that the computer architecture depicted in FIG. 2 could be applied to other entities of the system 100 with various modifications, including, for example, the data sources 125.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device 239, supporting the display of images, capturing and transmitting images, and performing complex tasks including various types of feature extraction and sampling. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the display device 239, the input/output device(s) 247, the query-time S&A application 103, and the data storage 243.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, as depicted in FIG. 2, the memory 237 may store the query-time S&A application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 may include a communication bus for transferring data between components of the computing device 200 or between computing device 200 and other components of the system 100 via the network 105 or portions thereof, a processor mesh, a combination thereof, etc. In some implementations, the query-time S&A application 103 and various other software operating on the computing device 200 (e.g., an operating system, device drivers, etc.) may cooperate and communicate via a software communication mechanism implemented in association with the bus 220. The software communication mechanism may include and/ or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.).

The display device 239 may be any conventional display device, monitor or screen, including but not limited to, a liquid crystal display (LCD), light emitting diode (LED), organic light-emitting diode (OLED) display or any other similarly equipped display device, screen or monitor. The display device 239 represents any device equipped to display user interfaces, electronic images, and data as described herein. In different embodiments, the display device 230 may output display in binary (only two different values for pixels), monochrome (multiple shades of one color), or multiple colors and shades. The display device 239 is coupled to the bus 220 for communication with the processor 235 and the other components of the computing device 200. In some implementations, the display device 239 may be a touch-screen display device capable of receiving input from one or more fingers of a user. For example, the display device 239 may be a capacitive touch-screen display device capable of detecting and interpreting multiple points of contact with the display surface. In some implementations, the computing device 200 (e.g., client device 115) may include a graphics adapter (not shown) for rendering and outputting the images and data for presentation on display device 239. The graphics adapter (not shown) may be a separate processing device including a separate processor and memory (not shown) or may be integrated with the processor 235 and memory 237.

The input/output (I/O) device(s) 247 may include any standard device for inputting or outputting information and may be coupled to the computing device 200 either directly or through intervening I/O controllers. In some implementations, the I/O device 247 may include one or more peripheral devices. Non-limiting example I/O devices 247 include a touch screen or any other similarly equipped display device equipped to display user interfaces, electronic images, and data as described herein, a touchpad, a keyboard, a scanner, a stylus, an audio reproduction device (e.g., speaker), a microphone array, a barcode reader, an eye gaze tracker, a sip-and-puff device, and any other I/O components for facilitating communication and/or interaction with users. In some implementations, the functionality of the input/ output device 247 and the display device 239 may be integrated, and a user of the computing device 200 (e.g., client device 115) may interact with the computing device 200 by contacting a surface of the display device 239 using one or more fingers. For example, the user may interact with an emulated (i.e., virtual or soft) keyboard displayed on the touch-screen display device 239 by using fingers to contact the display in the keyboard regions.

The communication unit 241 is hardware for receiving and transmitting data by linking the processor 235 to the network 105 and other processing systems via signal line 104. The communication unit 241 may receive data such as user input from the client device 115 and transmits the data to the query-time S&A application 103, for example an input of a data query or a user interaction to expand a view of the data on the user interface. The communication unit 241 also transmits information including on-demand data segments to the client device 115 for display, for example, in response to the data query or user interaction. The communication unit 241 is coupled to the bus 220. In some implementations, the communication unit 241 may include a port for direct physical connection to the client device 115 or to another communication channel. For example, the communication unit 241 may include an RJ45 port or similar port for wired communication with the client device 115. In other implementations, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In other implementations, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In yet other implementations, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. In some implementations, the data storage 243 may be coupled to the components 235, 237, 239, 241, and 247 via the bus 220 to receive and provide access to data. In some implementations, the data storage 243 may store data received from other elements of the system 100 including, for example, entities 101, 115, 120, 125, and/or the query-time S&A applications 110, and may provide data access to these entities. The data storage 243 may store, among other data, visualization data 222, query data 224, a table 226 or database 226, and session data 228. The data storage 243 stores data associated with implementing a query mechanism to facilitate query-time sessionization and analysis of data and other functionality as described herein. The data stored in the data storage 243 is described below in more detail.

The data storage 243 may be included in the computing device 200 or in another computing device and/or storage system distinct from but coupled to or accessible by the computing device 200. The data storage 243 may include one or more non-transitory computer-readable mediums for storing the data. In some implementations, the data storage 243 may be incorporated with the memory 237 or may be distinct therefrom. The data storage 243 may be a dynamic random-access memory (DRAM) device, a static random-access memory (SRAM) device, flash memory, or some other memory devices. In some implementations, the data storage 243 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In some implementations, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

It should be understood that other processors, operating systems, sensors, displays, and physical configurations are possible.

As depicted in FIG. 2, the memory 237 may include the query-time S&A application 103. In some implementations, the query-time S&A application 103 may include a query engine 201, a sessionization & analysis engine 203, a visualization engine 205, and a user interface engine 207. The components of the query-time S&A application 103 may each include software and/or logic to provide their respective functionality. In some implementations, the components of the query-time S&A application 103 may each be implemented using programmable or specialized hardware including a field-programmable gate array (FPGA) or an application-specific integrated circuit (ASIC). In some implementations, the components of the query-time S&A application 103 may each be implemented using a combination of hardware and software executable by the processor 235. In some implementations, the components of the query-time S&A application 103 may each be sets of instructions stored in the memory 237 and configured to be accessible and executable by the processor 235 to provide their acts and/or functionality. In some implementations, the components of the query-time S&A application 103 may each be adapted for cooperation and communication with the processor 235, the memory 237, and other components of the computing device 200 via the bus 220. In some implementations, the components of the query-time S&A application 103 may send and receive data, via the communication unit 241, to and from one or more of the client devices 115, the data server 101, the analytics database server 120, and data sources 125.

The query engine 201 may include software and/or logic to provide the functionality for facilitating query processing and analysis of large datasets, such as big data. For example, the datasets may include clickstream or customer event data relating to a customer flow or journey through a user experience, sales and marketing event data relating to a customer flow from advertisement to purchase, e-commerce event data relating to customer flow from product discovery to purchase, financial market event data relating to financial transactions, social media event data relating to social media feeds, information technology (IT) log data relating to IT events at an organization, etc. In some implementations, the query engine 201 may configure the analytics database server 120 implementing a data store (e.g., Apache Druid™) to ingest the incoming event-based data (e.g., streaming or batched) from an entity (e.g., data source 125 in FIG. 1) coupled to the network 105, create a database or table 226 of independent events, and store the table 226 in the data storage 243. In some implementations, the query engine 201 sends instructions to the user interface engine 209 to generate a user interface on the client device 115. For example, the user interface may be configured for receiving one or more queries relating to event-based data analysis from a user and displaying the results based on processing the queries.

In some implementations, the query engine 201 may provide a set of query tools including a query planner and a custom query language to make expressions for querying and interacting with the table 226 of independent events. In some implementations, the query engine 201 receives an input of a query from a user of the client device 115 to process against the table 226 of independent events. For example, the query may include a SQL query. In some implementations, the query engine 201 may expose one or more keywords for performing query-time sessionization and analysis of event-based data as described herein directly in SQL. The query engine 201 may add such keywords to the SQL grammar through an extension. In other implementations, the query engine 201 may convey the semantic meaning of keywords through the usage of a function, query hints/comments, or directly on a domain-specific query object. It should be understood that other grammar constructs may be used to expose similar semantically meaningful keywords.

In some implementations, the query engine 201 may pass the query onto the sessionization & analysis engine 203 (described in detail below) to both reconstruct a sample of sessions (i.e., sessionize) on the table of independent events and perform analysis on the reconstructed sample of sessions at query-time. The query engine 201 may store the query in the query data 224 of the data storage 243. The query engine 201, in cooperation with the sessionization & analysis engine 203, optimizes query performance by pushing down the processing and/or analysis tasks defined in the query closer to the database (e.g., table 226) by taking advantage of optimized and distributed processing capabilities of the underlying computing device 200. This involves pushing the processing and analysis tasks, such as filtering, sorting, joining, transformation, aggregation, etc. included in the query down to the table 226 rather than performing these tasks in the query-time S&A application 103 itself. For example, instead of loading the entire table 226 into the memory 237 and processing it, the query engine 201 in cooperation with the sessionization & analysis engine 203 sends the query to the table 226 where it is executed directly. This leads to performance improvements in terms of reduced data movement and faster, efficient data processing and analysis.

In some implementations, the query engine 201 facilitates distributed processing of the query across a cluster of computing devices or node machines (e.g., Java Virtual Machine (JVM)) coupled to the network 105. For example, the cluster of computing devices may be deployed by the analytics database server 120 and/or the data server 101. The query engine 201 parses the query and identifies one or more data segments of the table 226 that match certain criteria pertaining to the query. The query engine 201 identifies the cluster of computing devices (e.g., servers or nodes) serving the identified data segments pertaining to the query. The query engine 201 distributes the query in parallel to the identified cluster of computing devices for query processing. The query engine 201 receives the partially generated results from the plurality of distributed computing devices in the cluster and cooperates with the sessionization & analysis engine 203 to merge the partially generated results into a final result.

The sessionization & analysis engine 203 may include software and/or logic to provide the functionality for facilitating a reconstruction of a random sample of sessions from the table 226 and analyzing the reconstructed sessions at query-time. The sessionization & analysis engine 203 receives the query from the query engine 201, executes the query against the table 226, and performs session reconstruction and associated event-data data analytics in real time or close to real time at the time the query is executed. The sessionization & analysis engine 203 parses the query and identifies the parameters of the query, such as keywords, commands, identifiers, functions, etc. Specifically, the sessionization & analysis engine 203 may parse the query to identify a keyword that meaningfully limits the number of sessions to a random sample for the purposes of performing sessionization and analysis of event data in the table 226 at query-time. For example, the keyword may specify a size limit on sampling a number of sessions from the table 226 at query-time.

The sessionization & analysis engine 203 identifies one or more events from the table 226 and assigns them to a session with a unique session identifier. For example, a session may be a sequence of events with a start and an end, such as a user browsing and then closing a e-commerce website, an IoT device waking up to perform a task and then going back into rest mode, etc. In some implementations, a session may be defined by an identifier (e.g., user identifier, session identifier, or anything that the events may have in common), by a time period, and/or by a completion of a journey with an objective. The sessionization & analysis engine 203 groups a plurality of events from the table 226 into a sample of sessions limited by the query. The sessionization & analysis engine 203 may limit the number of sessions to a random sample of sessions for reconstruction based on a timeframe (e.g., hours, days, etc.), a set of users (member users, guest users, etc.), a geographical location (e.g., zip code, country, etc.), or any other criteria specified in the query that defines the sampling. Each reconstructed session in the sample of reconstructed sessions includes a sequence of events mapped to a unique identifier. For example, the unique identifier may include at least one from a session identifier, client device identifier, and a user identifier. The sessionization & analysis engine 203 uses an unbiased random sampling algorithm to sample the sessions from the table 226 as defined by the query. The sessionization & analysis engine 203 may use a sampling method that produces a random and unbiased sample that converges on a deterministic membership set in a distributed environment. In other words, the sessionization & analysis engine 203 uses any sampling method that produces a deterministic sample of the sessions in a distributed environment. This is advantageous because a sample set of sessions randomly selected and built out of all possible sessions from the table 226 is going to be representative of the whole. In some implementations, the sessionization & analysis engine 203 may store the sample of reconstructed sessions in the session data 228 of the data storage 243.

The sessionization & analysis engine 203 performs analysis on the sample of reconstructed sessions at the time the query is executed and generates a result. For example, the analysis may be performed to identify patterns and trends in user behavior in clickstream and web analytics. In another example, the analysis may be performed to measure the effectiveness of marketing campaigns by tracking metrics, such as user engagement, bounce rates, conversion rates, etc. In some implementations, the sessionization & analysis engine 203 facilitates funnel aggregation in addition to querying the table 226. The sessionization & analysis engine 203 may instantiate a time-series aggregator at query-time to aggregate a plurality of the events from the table 226 and store them as a time-ordered series of events to optimize for subsequent processing. The sessionization & analysis engine 203 may reconstruct a sample of sessions based on the time-ordered series of events. The sessionization & analysis engine 203 may transform the reconstructed sample of sessions into a data structure that is more suited for visualization and favoring user interactions. For example, the sessionization & analysis engine 203 may transform the reconstructed sample of sessions into a multi-rooted tree and instruct the visualization engine 205 (described in detail below) to generate a corresponding visualization using the multi-rooted tree. The visualization may be a funnel visualization facilitating a conversion of query-time sessionization of arbitrary event sequences into a true "time-ordered" funnels for data analysis.

The sessionization & analysis engine 203 may receive an example query in a semantic form as shown below or similar:

```
SELECT FUNNEL_ANALYSIS (funnel_description, session)
FROM (
  SELECT sessionId, SESSIONIZE (session_event_description,
  eventColumn)
  FROM table
  GROUP BY sessionId
) TABLESAMPLE (5000)
```

The above example query is received for performing a funnel analysis on a table 226 of independent events. The sessionization & analysis engine 203 processes the inner query to reconstruct or build sessions from the table 226. For example, the inner query uses the 'SESSIONIZE' function, the 'GROUP BY' clause and the 'TABLESAMPLE' keyword. The 'SESSIONIZE' function takes in two arguments: 'session event description' and 'eventColumn' where 'session event description' is a column that includes event descriptions and 'eventColumn' is a column that includes event data. The 'GROUP BY' clause is used to group the rows of the table 226 by 'sessionID.' The sessionization & analysis engine 203 identifies the keyword 'TABLESAMPLE' and determines the sample of sessions to use and focus on processing in the query. For example, the clause TABLESAMPLE (5000) is used to indicate a size limit on selecting and building a random sample of 5000 sessions or approaching the random sample of 5000 sessions for funnel analysis. That is, if the number of sessions to use in processing the query in the table 226 is found to be 1000 sessions, then the 1000 sessions are built and returned. There cannot be a sampling of the 1000 sessions. This is because the sampling rate in the present disclosure is defined based on the number of samples (not a percentage-based sampling where a percentage of the 1000 sessions get returned). The sampling rate is dynamic and is a function of the number of samples to hit and the data segments matching the criteria as defined in the query. It should be understood that the present disclosure may enable a different strategy for the keyword TABLESAMPLE from SQL to use a numerical limit instead of a percentage. The sessionization & analysis engine 203 may further facilitate analysis of the reconstructed sessions at query-time. The sessionization & analysis engine 203 processes the outer query to perform a funnel analysis on the result of the inner query. For example, the outer query uses the 'FUNNEL_ANALYSIS' function. The 'FUNNEL_ANALYSIS' function takes in two arguments: 'funnel_description' and 'session' where 'funnel_description' is a column that includes the funnel stage description and 'session' is the resulting random sample of 5000 sessions of the 'SESSIONIZE' function from the inner query. In some implementations, the knowledge of the 'session event description' and the 'funnel_description' may be used to optimize and plan a properly meaningful limitation of the sessions analyzed. The idea here is that, if a business user is wanting to understand, for example, how users got to a specific step of the funnel, they may first identify the sessions that achieved said step (using the sampling to control for size) and then go back and do a full analysis of the identified sessions to determine how the users got to that step. They may additionally perform subsequent queries to build up a larger group of sessions if it turns out that the initial queries did not produce as many sessions as they had hoped for, which may happen when the sessions are being filtered on a condition that can only be evaluated post-sessionization.

The sampling mechanism described in the present disclosure is advantageous as it limits the number of sessions analyzed in the query to a random sample of sessions from the table 226 to maintain sizing. Existing approaches naively group all of the events in the table 226 and materialize millions upon billions of sessions before any analytics on those sessions can be performed. However, the sampling mechanism in the present disclosure eliminates the need for additional or expensive computing resources to shuffle and re-shuffle millions of different session keys during query processing. Furthermore, existing approaches favor a sampling mechanism that uses a percentage. This naive approach is not helpful if the user wishes to filter or drill down deep into the data as relevant sessions may get discarded from further analysis.

The visualization engine 205 may include software and/or logic to provide the functionality for facilitating a visualization and analysis of large datasets, such as big data. In some implementations, the visualization engine 205 sends instructions to the user interface engine 207 to generate a user interface for facilitating an interactive exploration of event-based data, such as reconstructed sessions in the table 226. The visualization engine 205 receives the data structure for the reconstructed sessions from the sessionization & analysis engine 203, generates a visualization, and displays the visualization on the user interface of the client device 115. In one example, the visualization engine 205 uses the multi-rooted tree for generating a visualization. The visualization engine 205 converts the tree into a visualization of choice and renders the visualization. Example visualizations may include, but are not limited to, a flame graph, a flame chart, a funnel analysis chart, a process flow diagram, an icicle chart, a sunburst layout, or any other visualization built to display graph data. In one example, a funnel analysis chart visualization of clickstream/customer journey analysis data may help with understanding the flow of customers through an experience.

In some implementations, the visualization engine 205 may receive a user interaction in association with rendering the visualization of the data structure. The visualization engine 205 receives user interactions in the visualization of the data structure and tracks the changes to the view of the data resulting from the user interactions. The visualization engine 205 in cooperation with the user interface engine 207 sets up the user interface for interacting with the visualization. Example user interactions received in the user interface displaying the visualization on a client device 115 may include, but are not limited to, point-and-click, drag-and-drop, one-click, double-click, scroll, resize, expand, collapse, etc. The visualization engine 205 may generate the visualization of the data for the user to interact directly with a view of the aggregated session data structure by selecting corresponding graphical elements in the visualization on the user interface. For example, the graphical elements may correspond to selecting a subsection in the aggregated session data structure in terms of filtering and/or splitting to iteratively drill-down and analyze the data in the visualization.

In some implementations, the visualization engine 205 in cooperation with the query engine 201 determines a query based on receiving the user interaction in the visualization. For example, the query engine 201 uses the series of user interactions in the visualization to iteratively issue queries with a more and more refined filter set against the table 226. The visualization engine 205 sends the query to the sessionization & analysis engine 203 for performing sessionization and analysis at query-time. For each iterative refinement and filtering, the query engine 201 may issue a query that is sampling the same number of sessions in the table 226 as the previous query. In some implementations, the number of samples to hit in the next query may be user configurable. As such, the user interactions in the visualization to drill-down and analyze the data generates a new data structure for the subsequent updating of the visualization. In some implementations, the new data structure may represent a superset of the sessions initially analyzed, a strict subset or a non-overlapping set of sessions analyzed. The visualization engine 205 stores the data relating to the data structures and visualization in the visualization data 222 of the data storage 243.

The user interface engine 207 may include software and/or logic for providing user interfaces to a user. In some implementations, the user interface engine 207 receives instructions from one or more of the components 201, 203, and 205, generates a user interface according to the instructions, and transmits the user interface for display on the client device 115 as described herein. In some implementations, the user interface engine 207 sends graphical user interface data to an application (e.g., a browser) in the client device 115 via the communication unit 241 causing the application to display the data as a graphical user interface.

Figure 3:
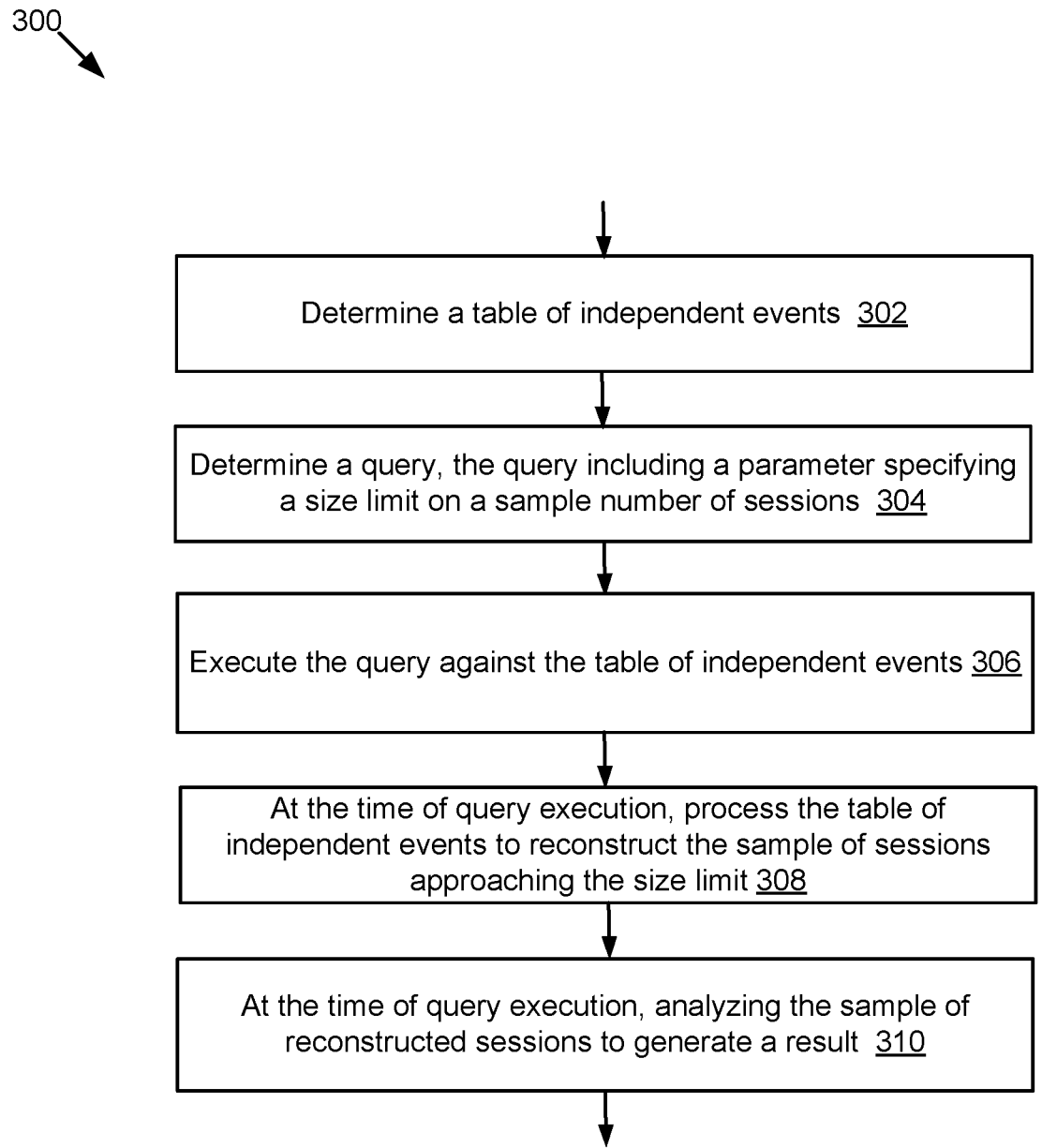
FIG. 3 is a flow diagram illustrating one implementation of an example method for performing query-time sessionization and analysis of data.

FIG. 3 is a flow diagram illustrating one implementation of an example method 300 for performing query-time sessionization and analysis of data. The method 300 may be performed by a system of one or more computing devices in one or more locations, including, for example, the data server 101, the analytics database server 120, and the client device 115 of FIG. 1.

At 302, the query engine 201 determines a table of independent events. At 304, the query engine 201 determines a query, the query including a parameter specifying a size limit on a number of sessions. At 306, the sessionization & analysis engine 203 executes the query against the table of independent events. At 308, the sessionization & analysis engine 203 processes the table of independent events to reconstruct the sample of sessions approaching the size limit at the time of query execution. At 310, the sessionization & analysis engine 203 analyses the sample of reconstructed sessions to generate a result.

A system and method for implementing a query mechanism to facilitate query-time sessionization and analysis of data has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the present invention applies to any type of computing system that can receive data and commands, and present information as part of any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining a table of independent events based on a stream of incoming, up-to-date, and raw event-based data, a plurality of data segments comprising the table of independent events being distributed across a cluster of computing devices;
   determining a query, the query including a criteria for grouping a plurality of independent events from the table of independent events into a session and a parameter for specifying a size limit on reconstructing a sample of sessions from the table of independent events;
   distributing the query in parallel to the cluster of computing devices for executing the query against the table of independent events;
   at the time of query execution on each computing device in the cluster of computing devices, processing, in real time, the plurality of data segments comprising the table of independent events to dynamically and randomly reconstruct the sample of sessions using a random sampling method, the sample of sessions matching the criteria and the size limit in the query, a sampling rate for dynamically and randomly reconstructing the sample of sessions being a function of the size limit and the plurality of data segments comprising the table of independent events, the sample of sessions being representative of a whole set of possible sessions from the table of independent events, each session in the sample of sessions including a time-ordered series of independent events occurring within a period of time and mapped to a unique identifier; and
   at the time of query execution on each computing device in the cluster of computing devices, analyzing, in real time, the sample of sessions to generate a result.

2. The computer-implemented method of claim 1, further comprising:
   at the time of query execution, processing the table of independent events to aggregate a plurality of independent events into the time-ordered series of independent events and reconstruct the sample of sessions based on the time-ordered series of independent events;
   transforming the sample of sessions into a data structure; and
   rendering a visualization based on the data structure.

3. The computer-implemented method of claim 2, wherein determining the query further comprises:
   receiving a user interaction in association with the visualization; and
   determining the query based on the user interaction.

4. The computer-implemented method of claim 1, further comprising performing funnel analysis using the result.

5. The computer-implemented method of claim 1, wherein the criteria includes at least one from a timeframe, a set of users, and a geographical location.

6. The computer-implemented method of claim 1, wherein the unique identifier includes at least one from a session identifier, client device identifier, and a user identifier.

7. The computer-implemented method of claim 1, wherein the table of independent events is loaded with data retrieved from one of a streaming data source and a batch data source.

8. A system comprising:
   one or more processors; and
   a memory, the memory storing instructions, which when executed cause the one or more processors to:
   determine a table of independent events based on a stream of incoming, up-to-date, and raw event-based data, a plurality of data segments comprising the table of independent events being distributed across a cluster of computing devices;
   determine a query, the query including a criteria for grouping a plurality of independent events from the table of independent events into a session and a parameter for specifying a size limit on reconstructing a sample of sessions from the table of independent claims;
   distributing the query in parallel to the cluster of computing devices to execute the query against the table of independent events;
   at the time of query execution on each computing device in the cluster of computing devices, process, in real time, the plurality of data segments comprising the table of independent events to dynamically and randomly reconstruct the sample of sessions using a random sampling method, the sample of sessions matching the criteria and the size limit in the query, a sampling rate for dynamically and randomly reconstructing the sample of sessions being a function of the size limit and the plurality of data segments comprising the table of independent events, the sample of sessions being representative of a whole set of possible sessions from the table of independent events, each session in the sample of sessions including a time-ordered series of independent events occurring within a period of time and mapped to a unique identifier; and at the time of query execution on each computing device in the cluster of computing devices, analyze, in real time, the sample of sessions to generate a result.

9. The system of claim 8, wherein the instructions further cause the one or more processors to:

at the time of query execution, process the table of independent events to aggregate a plurality of independent events into the time-ordered series of independent events and reconstruct the sample of sessions based on the time-ordered series of independent events;

transform the sample of sessions into a data structure; and render a visualization based on the data structure.

10. The system of claim 9, wherein to determine the query, the instructions further cause the one or more processors to:

receive a user interaction in association with the visualization; and determine the query based on the user interaction.

11. The system of claim 8, wherein the instructions further cause the one or more processors to perform funnel analysis using the result.

12. The system of claim 8, wherein the criteria includes at least one from a timeframe, a set of users, and a geographical location.

13. The system of claim 8, wherein the unique identifier includes at least one from a session identifier, client device identifier, and a user identifier.

14. The system of claim 8, wherein the table of independent events is loaded with data retrieved from one of a streaming data source and a batch data source.

* * * * *